United States Patent
Rive et al.

(10) Patent No.: US 10,128,659 B2
(45) Date of Patent: Nov. 13, 2018

(54) ENERGY GENERATION INTERACTIONS BYPASSING THE GRID

(71) Applicant: SolarCity Corporation, San Mateo, CA (US)

(72) Inventors: Peter Joshua Rive, San Francisco, CA (US); Eric Daniel Carlson, San Mateo, CA (US)

(73) Assignee: SolarCity Corporation, San Mateo, CA (US)

( * ) Notice: Subject to any disclaimer, the term of this patent is extended or adjusted under 35 U.S.C. 154(b) by 152 days.

(21) Appl. No.: 15/153,037

(22) Filed: May 12, 2016

(65) Prior Publication Data

US 2017/0331292 A1 Nov. 16, 2017

(51) Int. Cl.
*H02J 3/32* (2006.01)
*H02J 3/38* (2006.01)
*H02J 13/00* (2006.01)

(52) U.S. Cl.
CPC .............. *H02J 3/382* (2013.01); *H02J 3/381* (2013.01); *H02J 3/32* (2013.01); *H02J 13/0006* (2013.01); *H05K 999/99* (2013.01)

(58) Field of Classification Search
CPC .................................. H02J 3/382; H02J 3/32
USPC ........................................... 307/19; 700/295
See application file for complete search history.

(56) References Cited

U.S. PATENT DOCUMENTS

| | | | | |
|---|---|---|---|---|
| 8,987,939 | B2* | 3/2015 | Yu .............................. | H02J 3/28 307/43 |
| 9,660,451 | B1* | 5/2017 | Naiknaware ........ | H02J 13/0024 |
| 2001/0034569 | A1* | 10/2001 | Yamamoto ............. | G06Q 50/06 700/295 |
| 2006/0229767 | A1* | 10/2006 | Chu .......................... | H02J 3/00 700/286 |
| 2008/0167931 | A1* | 7/2008 | Gerstemeier .......... | G06Q 10/06 705/7.22 |
| 2010/0207448 | A1* | 8/2010 | Cooper ..................... | H02J 3/14 307/20 |
| 2013/0013123 | A1* | 1/2013 | Ozaki ................. | B60L 11/1842 700/295 |
| 2013/0099565 | A1* | 4/2013 | Sachs ........................ | H02J 3/46 307/25 |
| 2013/0197710 | A1* | 8/2013 | Hansen ............... | B60L 11/1824 700/297 |
| 2015/0001945 | A1* | 1/2015 | Estes ....................... | H02J 9/062 307/66 |
| 2015/0066231 | A1* | 3/2015 | Clifton ...................... | H02J 3/32 700/296 |
| 2015/0288183 | A1* | 10/2015 | Villanueva, Jr. ........ | H02J 3/005 700/291 |
| 2016/0079757 | A1* | 3/2016 | Matan ..................... | H02J 3/382 307/24 |
| 2016/0134110 | A1* | 5/2016 | Waki ........................ | H02J 3/00 700/287 |

(Continued)

*Primary Examiner* — Adi Amrany
(74) *Attorney, Agent, or Firm* — Kilpatrick Townsend & Stockton LLP

(57) ABSTRACT

Methods, devices, and systems for controlling energy generation interactions that bypass the grid may be provided. Flow control devices may be directly connected with one another independent of electrical connections to the utility grid. In some examples, the direct connections between the devices may enable sharing of power, controlling power flow over the direct connections, and/or recording relative power flows between the devices.

18 Claims, 10 Drawing Sheets

(56) References Cited

U.S. PATENT DOCUMENTS

2016/0189319 A1* 6/2016 Jungerman ............ G06Q 50/06
                                                    705/7.25
2016/0204606 A1* 7/2016 Matan ....................... H02J 3/38
                                                    700/291
2017/0149244 A1* 5/2017 Recio ........................ H02J 3/16
2017/0331325 A1* 11/2017 Ristau ...................... H02J 9/04
2018/0115158 A1* 4/2018 Waki ........................ H02J 3/00

* cited by examiner

ENERGY GENERATION INTERACTIONS BYPASSING THE GRID

BACKGROUND

In recent years, climate awareness and the cost of energy have increased to the point that many consumers have begun to install renewable energy generation systems at both residential and non-residential locations. Solar photovoltaic (PV) systems, for example, have become relatively popular and can be connected to an inverter for converting the energy into a usable A/C source for the location. Additionally, battery backup systems can be installed at locations and can store electricity for later use (e.g., when energy costs are higher or during an outage). However, most of these alternative-source systems are connected to the grid using pre-existing electrical cables and utility company infrastructure. As such, they are not equipped to effectively manage power flow between the systems without accounting for control and/or regulatory issues. Still, even ignoring utility infrastructure constraints, current systems lack inter-system interaction capabilities.

BRIEF SUMMARY

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to one embodiment, a device for managing power flow between a plurality of electrical systems is described. In some examples, the device may comprise an electrical cable configured to connect, independent of connections to a power grid, a first end-user electrical system of the plurality of electrical systems to a second end-user electrical system of the plurality of electrical systems. The device may also comprise an inverter, coupled with the electrical cable, configured to change a type of power from a direct current form to an alternating current form. The device may also comprise a memory configured to store computer-executable instructions, and a processor configured to access the memory and execute the computer-executable instructions. In some cases, the device may be configured to identify power generated by a photovoltaic cell of the first end-user electrical system of the plurality of electrical systems. The device may also be configured to change the type of the power, utilizing the inverter, from the direct current form to the alternating current form and/or identify a power draw of first amount of the power from the second end-user electrical system of the plurality of electrical systems. In some examples, the device may be configured to control a first flow of the first amount of the power over the electrical cable from the first end-user electrical system of the plurality of electrical systems to the second end-user electrical system of the plurality of electrical systems based at least in part on the power draw. Additionally, the device may be configured to receive a second flow of the power over the electrical cable from the second end-user electrical system of the plurality of electrical systems and/or monitor relative power flow between the plurality of electrical systems based at least in part on the first flow of the power and the second flow of power over the electrical cable.

In some embodiments, the electrical cable may not be connected to a utility power source or the power grid associated with the utility power source. The power draw may be identified based at least in part on a request received from the second end-user electrical system of the plurality of electrical systems. Additionally, in some cases, the second flow of the power from the second end-user electrical system may be received based at least in part on a request sent from the first end-user electrical system to the second end-user electrical system. In some aspects, the first flow of the first amount of power over the cable may be controlled by changing an impedance of the electrical cable. Additionally, the device may also comprise a rectifier, coupled with the electrical cable, configured to change the type of power from the alternating current form to the direct current form, and the second flow of the power may be received from the second end-user electrical system in the alternating current form. The device may also comprise a metering device coupled with at least one of the electrical cable, the memory, or the processor, and the relative power flow between the plurality of electrical systems may be further monitored based at least in part on a metric of the metering device. In some embodiments, the device may also be configured to calculate a relative power metric for the plurality of electrical systems based at least in part on the relative power flow monitored by the device. Further, the relative power flow between the plurality of electrical systems may be further monitored based at least in part on a determination of relative power consumption of the plurality of electrical systems.

According to another embodiment, a computer-implemented method for managing power flow between a plurality of electrical systems is described. In some examples, the method may be configured to control a flow of power over a cable connection, independent of any connections to a utility grid, between a first end-user electrical system of the plurality of electrical systems and a second end-user electrical system of the plurality of electrical systems. The method may also be configured to monitor relative power flow between the first end-user electrical system and the second end-user electric system based at least in part on the flow of the power over the cable connection. In some examples, the power may comprise electricity in a direct current form, and the flow of the power over the cable may be controlled by changing a direct current voltage of the electricity. In some examples, controlling the flow of power over the cable connection may comprise providing power over the cable connection from the first end-user electrical system to the second end-user electrical system. The method may also be configured to store a metric associated with the relative power flow based at least in part on an amount of the power provided over the cable connection from the first end-user electrical system to the second end-user electrical system. The method may also be configured to determine an amount to charge an entity associated with the second end-user electrical system based at least in part on the metric associated with the relative power flow.

According to another embodiment, a system for managing power flow between a plurality of electrical systems is described. The system may comprise a memory configured to store computer-executable instructions, and a processor configured to access the memory and execute the computer-executable instructions. The system may be configured to identify an electrical connection, independent of connections to a utility grid, between a first end-user electrical system of the plurality of electrical systems and a second end-user electrical system of the plurality of electrical systems. The system may also be configured to receive information that identifies that at least a first device of the first end-user electrical system provided a flow of power over the electrical connection from the first end-user electrical system of the plurality of electrical systems to the second end-user electrical system of the plurality of electrical systems. Additionally, the system may be configured to monitor relative power flow between the first end-user electrical system and the second end-user electric system based at least in part on the flow of the power through the electrical connection. In some cases, the plurality of electrical systems may be external to the utility grid. The system may also be configured to receive flow data from the first device that identifies the relative power flow between the first end-user electrical system and the second end-user electric system. The system may also be configured to determine an amount to credit an entity associated with the first end-user electrical system based at least in part on the flow data.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
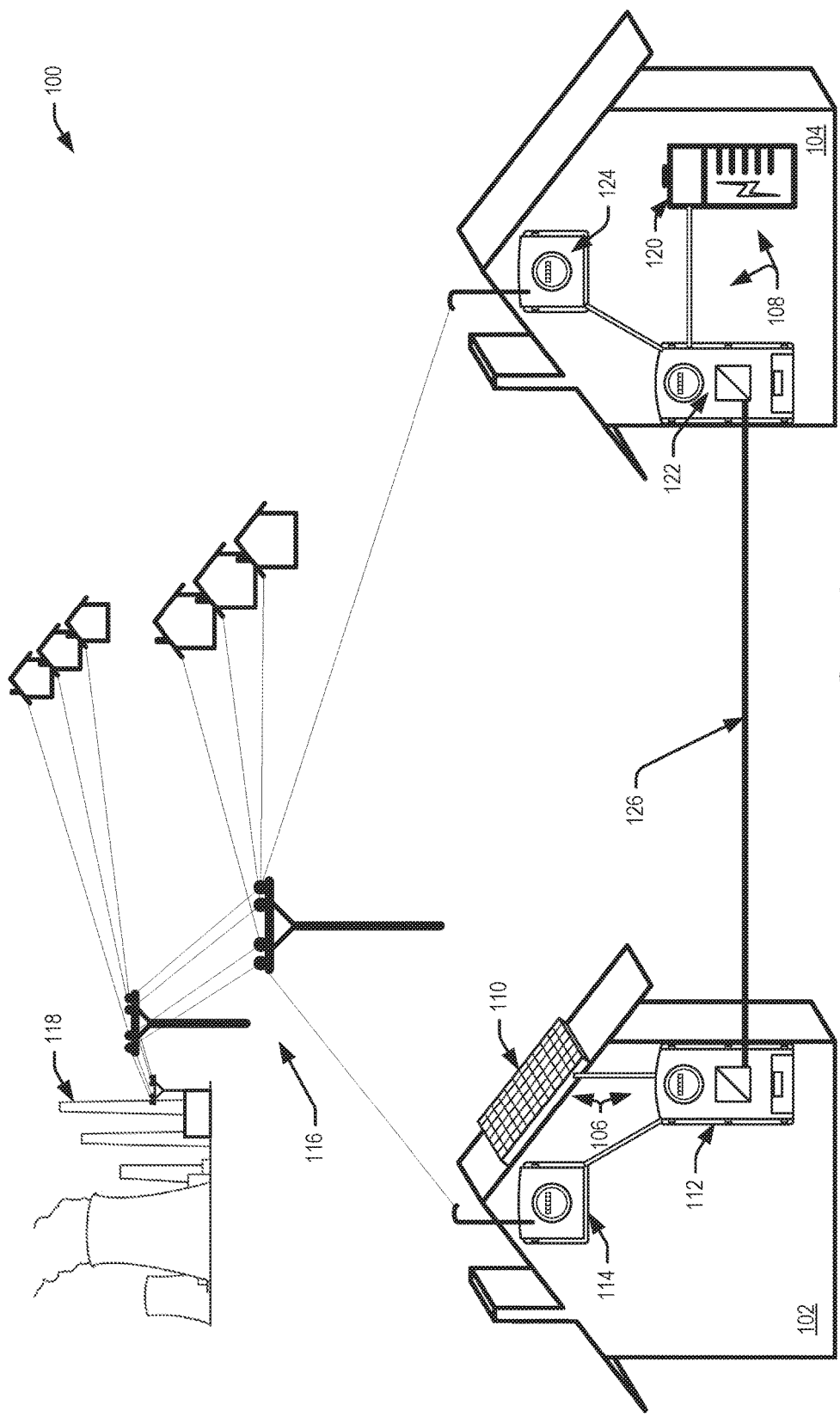
FIG. 1 is a simplified block diagram illustrating an example architecture and environment for controlling energy generation interactions that bypass the grid as described herein, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

Examples of the present disclosure are directed to, among other things, managing interactions between energy generation systems. In some examples, the interactions may bypass a utility grid or other public or private energy network. For example, each energy generation system may be physically connected to a power grid (e.g., a utility company); however, interactions between the systems may be independent of the physical connections to the power grid. In other words, the interactions may not involve the power flowing from the grid to the energy generation systems. In some cases, the interactions may be facilitated or otherwise enabled by a flow control (e.g., a power flow control device) or other electronic device, as described herein. The flow control device may be connected to the grid, other components of the energy generation system (e.g., a PV array, a battery backup, etc.), and/or components or appliances (e.g., lights, refrigerators, consumer electronics, etc.) at the location of the energy generation system. In some cases, each energy generation system may be associated with an end-user. For example, a single family home may have its own energy generation system that is associated with an end-user. Additionally, each unit (or a subset of units) of an apartment or condominium building may be equipped with its own energy generation system and may be associated with respective end-users (e.g., the resident of each unit). Thus, end-user energy generation systems may not be systems or nodes within a utility power station or other utility-operated systems on the utility grid.

An energy generation system may be any set of electrical and/or mechanical components that, together, generate and/or store energy for use by the system itself or for sharing with/providing to others. In other words, any system that can act as a source of power for another system may be considered an energy generation system, regardless of whether the power to be provided is generated directly by the system itself. Examples of energy generation systems may include systems (e.g., located at a house, a commercial business location, etc.) with a PV array, a battery backup (pack), a hydroelectric generator, a wind turbine, or the like. End-user energy generation systems may be those that are associated with an end-user, business, or location. These systems may, but need not, be equipped with power inverters and/or rectifiers for converting the power from alternating current (AC) form to direct current (DC) form or from DC to AC, as desired. Combinations of any of the above referenced energy generation devices may also be considered energy generation systems (e.g., a system may include a PV array, an inverter, and a battery backup). Some energy generation systems may not actually generate any power (e.g., an end-user system with a battery pack) and may, thus, be referred to as energy storage systems. However, if the energy storage system is configured to act as a source to other systems (e.g., other end-user systems), then it may also be considered an energy generation system for the sake of this disclosure. As such, an energy storage system may be considered a type of energy generation system.

In some examples, an energy generation system may be equipped with a flow control device configured to manage and/or control a flow of power from one energy generation system to another. The flow of power may be provided over an electrical cable that connects one energy generation system to another, or others. In some cases, the electrical cable (power line) may be the same cable that connects each energy generation system to the utility grid. In this use case, controlling the flow of power independent of the utility grid may include identifying an amount of power supplied back to the grid and identifying an amount of that power used by another user connected to the grid. However, in some examples, the flow of power may instead be provided over an electrical cable that connects directly from one energy generation system to another. In this use case, the electrical cable may provide a direct connection from a first flow control device (e.g., of a first energy generation system) to a second flow control device (e.g., of a second energy generation system). This direct connection may be independent of other connections or electrical cables that connect the site (location) to the utility grid. Thus, the flow of power that is controlled and/or managed over the electrical cable may not be accessible by or capable of being provided to the utility grid at all, although such complete independence is not required.

Some flow control devices may be configured with inverters and/or rectifiers (converters) for changing the power from AC to DC or from DC to AC. In this way, the flow control devices may be able to take power generated by a DC source (e.g., a PV array or the like) and change it to AC power that can be used by appliances and/or provided back to the grid, as desired. Additionally, the flow control devices may be able to take AC power (e.g., from the grid or from another AC source) and change it to DC power that can be stored in a battery or provided over the dedicated electrical cable described above (e.g., to another energy generation device or another flow control device). Additionally, flow control devices may be able to communicate with one another to send and/or receive requests for certain amounts of power and/or to provide instructions or configuration information to one another. The flow control devices can intelligently provide appropriate amounts of power from one system to another and/or account for relative amounts of power flow and/or power usage between the two systems. For example, if one system needs power, the respective flow control device may request a particular amount of power from another. Based at least in part on that request, the source flow control device may control the flow of power to the requesting device. At least one device, but in some examples both devices, can keep an accounting of the relative power flows that occurred before, during, and/or after the power flow is provided. As such, total relative power flows and/or power consumption (usage) can be tracked. In some examples, power credits and/or debits may be managed between accounts of the two systems such that one system may "owe" the other system a certain amount of power (e.g., to be provided at a later time). In some examples, a first end-user may charge a second end-user for the second end-user's usage of the first end-user's power. Any suitable payment system or instrument may be used, including actual payment (e.g., check, bank transfer, electronic payment, etc.) and/or virtual payment (e.g., using points, credits, or the like).

Flow control devices may be configured with one or more computing/control systems including at least processors, memory, and/or communication devices. The communication devices may be configured for communicating with other flow control devices and/or a server accessible over a network (e.g., the Internet or other public or private networks). Further, in some examples, a gateway device may be located at the location (e.g., the location of the flow control device) and may be configured to facilitate communication between the flow control devices and the server. Essentially, the gateway device may route signals from the flow control devices to the server, and vice versa. In some examples, environmental condition changes and/or performance changes may be reported to a remote server. Remote (e.g., at the server) and/or local (e.g., at the device) diagnostic checks may be performed to identify current working conditions or operational data of the system. In some examples, signals may be sent to the flow control devices periodically and/or based on a trigger (e.g., a request) to provide instructions for controlling the flow of power and/or tracking (accounting) relative flow and/or consumption of the energy generation systems.

FIG. 1 shows example system 100, where two locations 102, 104 may each include end-user electrical systems (e.g., power generation system 106 and power storage system 108, respectively). Power generation system 106 may include PV array 110 and flow control device 112. As noted, flow control device 112 may include one or more inverters and/or rectifiers for converting the power from AC to DC and vice versa, as appropriate. Location 102 may also include meter (e.g., a smart meter) 114 configured to receive AC power from and/or provide AC power to grid 116 that carries power generated by utility 118. As shown, flow control device 112 can be electrically connected to both meter 114 and PV array 110. As such, inverters and/or rectifiers may be placed or integrated appropriately to ensure that power sent between the components is in the correct form (e.g., AC or DC, voltage, and the like). Meter 114 may be configured to account for power from utility grid 116 that is consumed at location 102. PV array 110 can generate DC power and provide that power to flow control device 112 and/or local battery backup.

Power storage system 108 may include battery backup device 120 and flow control device 122. Much like power generation system 106, power storage system 108 may include one or more inverters and/or rectifiers for converting the power from AC to DC and vice versa, as appropriate. Location 104 may also include meter 124 configured to receive AC power from and/or provide AC power to grid 116. As shown, flow control device 122 can be electrically connected to both meter 124 and battery backup 120. Again, inverters and/or rectifiers may be placed or integrated within components appropriately to ensure that power sent between the components is in the correct form (e.g., AC or DC). Meter 124 may be configured to account for power from utility grid 116 that is consumed at location 104. Battery backup 120 can store DC power and provide that power to flow control device 122 and/or other DC powered components.

In some examples, the flow of power can be controlled such that power can be provided from flow control device 112 to flow control device 122 utilizing a direct electrical connection made with electrical cable 126. Electrical cable 126 can be an AC line or a DC line, as desired. If electrical cable 126 is an AC line, flow control device 112 may be configured to alter an impedance of electrical cable 126 in order to control an amount of power that is provided to flow control device 122. In some examples, location 104 may not be equipped with a flow control device at all. In this case, flow control device 112 may simply provide the flow of power to meter 124 or some other device configured to receive AC power. Alternatively, if electrical cable 126 is a DC line, flow control device 112 may be configured to adjust a voltage amount of DC that is provided over electrical cable 126. In some examples, the DC voltage may be adjusted by changing the output of a rectifier or other converter that outputs DC power. As noted, flow control devices 112, 122 can be equipped with one or more metering devices for measuring the amount of power that is provided and/or received over electrical cable 126. In some examples, flow control devices 112, 122 may also be equipped with a data storage device configured to store a table or other data structure for tracking relative amounts of power that are provided and/or received. Additionally, in some examples, the data may be transmitted to a server that stores or otherwise manages the relative power flow data.

When electrical cable 126 is a DC line, DC power from PV array 110 may be provided directly without conversion. However, in some examples, flow control device 112 may control the flow by using a DC to DC converter so that the output of the converter can act as the voltage control for the flow of power. Alternatively, the DC power could be changed to AC by an inverter, and then converted back to DC by a rectifier. However, in some cases (e.g., if location 102 does not have a PV array or if PV array 110 is not producing power), power that is received at meter 114 may be converter using a rectifier to DC form, and then flow control device 112 can provide a flow of power over electrical cable 126. Alternatives to providing DC power over electrical cable 126 may include AC motors (e.g., that are powered by an AC source) that spin DC generators. The DC generators may provide an output in DC form that can be controlled by flow control device 112.

When electrical cable 126 is an AC line, DC power that is provided by either PV array 110 or battery pack 120 may need to be changed to AC utilizing an inverter or other techniques. Once inverted to AC, flow control device 112 or 122 could provide a flow of power over electrical cable 126 by altering the impedance of electrical cable 126. Electrical cable 126 can be buried underground or attached to an existing or new pole, to be suspended over locations. In some examples, each location may need a single cable connection for each other location to which it is to be connected. For example, if location 102 were to be connected to location 104 as well as three other locations, a total of four individual cables could be used, one for each direct connection. However, in some examples, a trunk line may be used that acts as a bus for all power flow. In this case, each location may have its own direct cable connection to the trunk, but not to each individual other location. With a trunk line, each flow control device may be configured to control an amount of power put onto and/or drawn off the trunk line. Additionally, in some examples, a mesh network may be utilized where each flow control device is configured with one or more ports that connect to one or more other flow control devices. Further, in some examples, a multi-drop configuration (e.g., a daisy chain configuration) may be utilized where each flow control device is attached to an adjacent flow control devices in a linear fashion.

Example system 100 of FIG. 1 illustrates location 102 configured with energy generation system 106 (e.g., a first end-user electrical system) and location 104 configured with energy storage system 108 (e.g., a second end-user electrical system). However, this is just one example of many different configurations that could be used to illustrate the features described herein. For example, location 102 could instead be configured with an energy storage system or it could be configured as energy generation system 106 with a battery backup. Other storage and/or generation devices may also be connected at location 102. Similarly, location 104 could instead be configured with an energy generation system or it could be configured as energy storage system 108 with a PV array or other power generation mechanisms.

Figure 2:
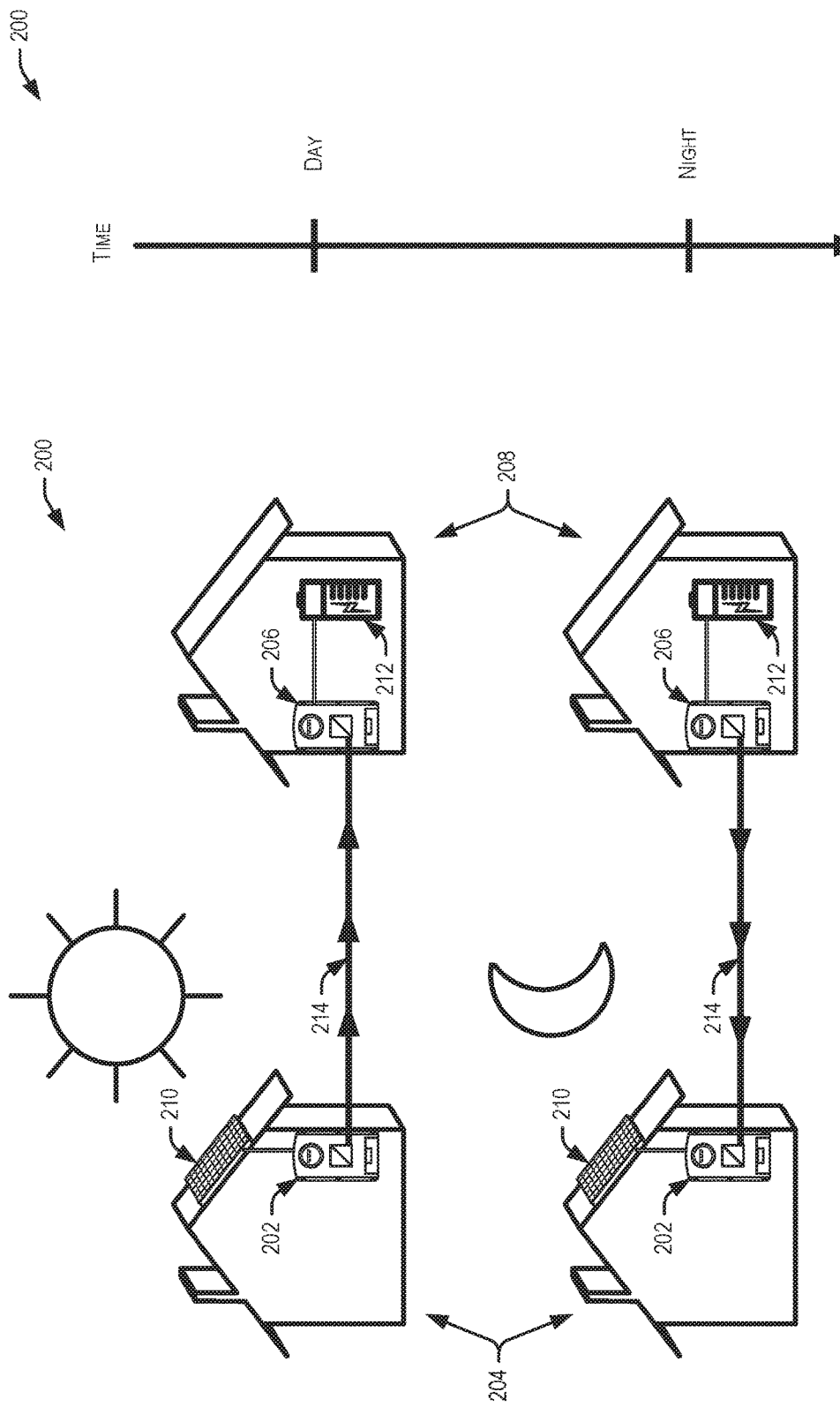
FIG. 2 is another simplified block diagram illustrating at least some features associated with controlling energy generation interactions that bypass the grid as described herein, according to at least one example.

FIG. 2 shows example 200 where flow control device 202 of location 204 is directly connected to flow control device 206 of location 208 via electrical cable 210. Flow control device 202 is part of an energy generation system (e.g., a first end-user electrical system) that includes PV array 210 at location 204, and flow control device 206 is part of an energy storage system (e.g., a second end-user electrical system) that includes battery backup 212. Flow control devices 202, 206 may both be connected to respective AC power meters that might be receiving AC power from a utility grid or other source. In some examples, independent of any power received from the utility grid, DC power may be generated by PV array 210 (e.g., during the day when the sun is shining). At least a portion of the DC power generated by PV array 210 may then be provided by flow control device 202 to flow control device 206 over electrical cable 214. Depending on the type of electrical cable 214 (AC or DC), the DC power that is to be provided may need to be converted to AC power (e.g., by an inverter at location 204 and/or integrated within flow control device 202). Further, the flow of the power may be controlled by changing the impedance of electrical cable 214. Once received by flow control device 206, the power that is flowing over electrical cable 214 may be stored in battery backup 212. Again, depending on the type of cable (AC or DC), the power may need to be converted back to DC power for storage with battery backup 212. As noted, in some examples, this may occur during the daytime when the sun is shining and PV array 210 is capable of generating DC power. In some examples, appliances as well as other household electronics of both locations 204, 208 may be powered by the DC power generated by PV array 210 during the daytime.

At night, PV array 210 may not be capable of generating power. As such, location 204 may need to rely on grid power or request power from the energy storage system of location 208. For example, during the day, battery backup 212 was charging from power that was being provided by flow control device 202. As such, at night, the battery backup 212 may be fully charged and/or capable of powering the appliances and/or household electronics of both locations 204, 208. Flow control device 202 may send a request to flow control device 206, requesting power. Alternatively, flow control device 202 may begin to draw from electrical cable 214 and flow control device 206, sensing the draw, may provide an appropriate amount of power. The power provided over electrical cable 214 at night (e.g., when battery backup 212 is the source) may be controlled by flow control device 206 and provided over electrical cable 214. Additionally, both flow control devices 202, 206 may have measured the relative amounts of power that flowed over electrical cable 214. In some examples, a record may be kept that indicates which energy generation system has provided more power to the other and/or which location 204, 208 has consumed more power from the other. Absolute power flow metrics may also be stored, such that flow control device 202 may know exactly how much power it has provided to which other end-user systems, and exactly how much power it has received from which other end-user systems. Further, this data may be provided to a server.

While example 200 of FIG. 2 shows only two locations 204, 206, any number of different sites may be configured and/or connected to one another. One of ordinary skill will understand how example 200 may scale to a larger number of sites, locations, and/or end-user systems. Additionally, while example 200 shows a time scale that goes from day to night, where PV array 210 is only able to generate power during the day, it should be understood that alternative scenarios exist with similar results. For example, it is possible that cloud cover or other inclement weather may impact the amount of sunlight accessible to PV array 210 during the day. As such, even during the day, if at any time PV array 210 is unable to generate power, the flow of power may be reversed as shown in the night example of FIG. 2. Additionally, similar to example system 100 of FIG. 1, location 204 and/or location 208 may be configured as energy generation and/or energy storage systems. For example, both locations may be equipped with PV arrays, instead of just location 204, and/or battery backups, instead of just location 206. Additionally, either or both locations 204, 208 may also be connected to a utility grid via an electrical wire other than cable 214.

Figure 3:
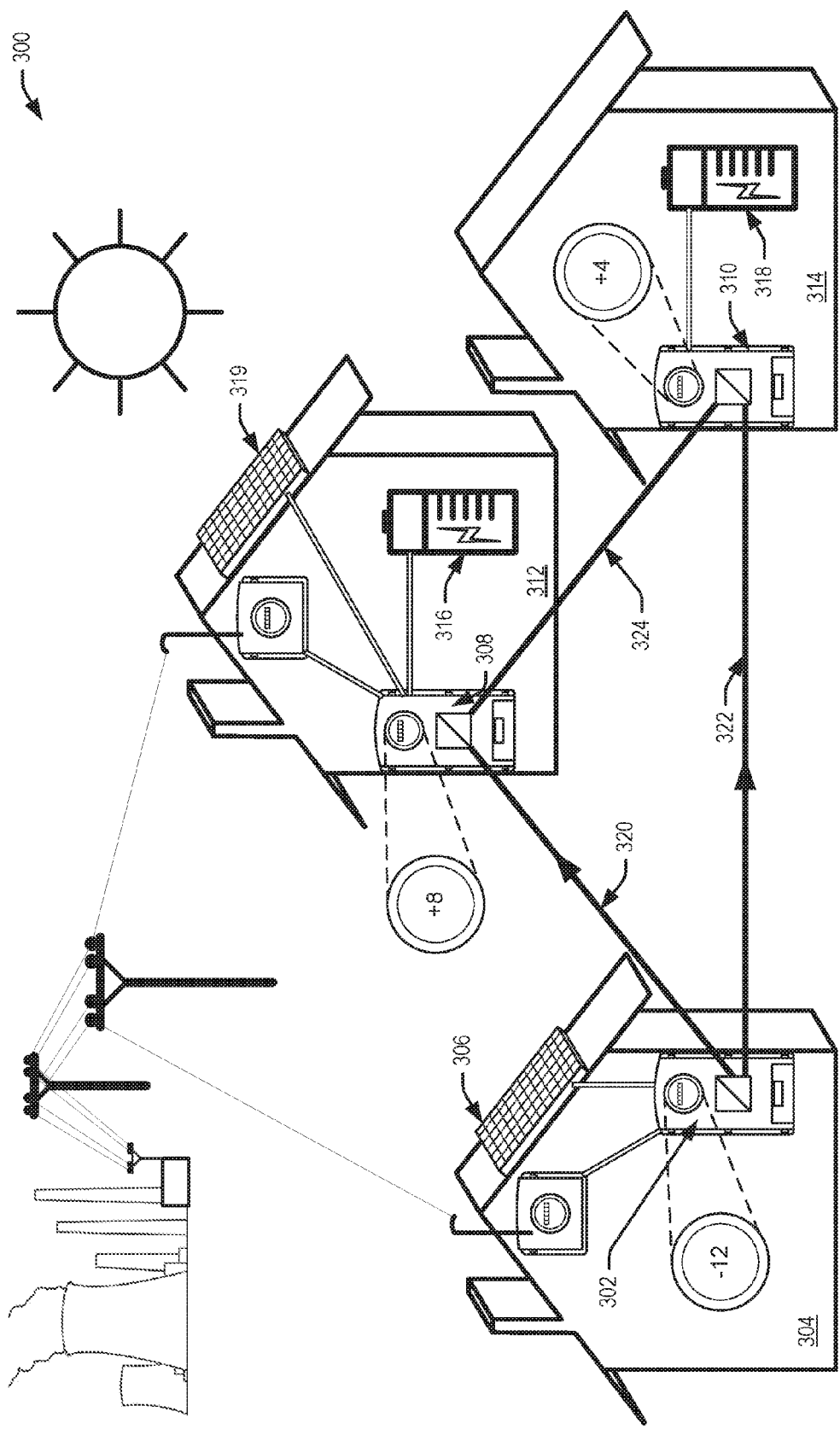
FIG. 3 is another simplified block diagram illustrating at least some additional features associated with controlling energy generation interactions that bypass the grid as described herein, according to at least one example.

FIG. 3 shows example 300 where flow control device 302 of location 304 is configured with PV array 306, while flow control devices 308, 310 of locations 312, 314, respectively, are each configured with battery backups 316, 318, respectively. Additionally, location 312 may also be configured with PV array 319. It should be noted, however, that any number of different sites with different energy generation and/or storage systems may be set up and this is but one example of many possibilities. Still, in example 300, each of the individual flow control devices is directly connected by a single electrical cable. For example, flow control device 302 is connected directly to each of flow control devices 308, 310 by cables 320, 322, respectively. Flow control device 310 is connected to each of flow control devices 302, 308 by cables 322, 324, respectively. Similarly, flow control device 308 is connected to each of flow control devices 302, 310 by cables 320, 324, respectively. As such, power flow from flow control device 302 is sent directly over cable 320 to flow control device 308. The amount of power provided can be controlled, monitored, and/or recorded by either (or both of) flow control devices 302, 308. Additionally, power flow from flow control device 302 is sent directly over cable 322 to flow control device 310. The amount of power provided can be controlled, monitored, and/or recorded by either (or both of) flow control devices 302, 310. While example 300 does not show power being controlled from flow control device 308 to flow control device 310 (or vice versa), it should be understood that this is completely possible and may be likely. For example, if one of battery backups 316, 318 has less charge capabilities, less charge life, or less power stored, one of the flow control devices may send power across cable 324 to the other. In another example, if battery backup 316 was able to collect more energy (e.g., from PV array 319) during a period of time than battery backup 318, flow control device 310 may request power from flow control device 308 at a time when utility power costs are high, battery backup 318 is sufficiently depleted, and/or power from flow control device 302 is not available.

In some examples, relative power flow may be measured and stored. For example, example 300 shows that 12 kWh of power have been provided over cables 320, 322 to flow control devices 308, 310. Additionally, example 300 shows that flow control device 308 has used 8 kWh of the 12 kWh provided by flow control device 302 and flow control device 310 has used 4 kWh of the 12 kWh provided by flow control device 302. While this is only one example of many, one of the ordinary skill would recognize that any metrics may be used to track relative amounts of power that are transmitted across power lines to respective recipients. Additionally, while example 300 shows flow control device 302 measuring a total amount of power that was provided, the metrics and/or records may be more granular in that flow control device 302 may actually store a table or other data structure that keeps track of exactly how much power was provided over which cable to which end-user system. Thus, instead of storing "−12" to represent that a total of 12 units (e.g., 12 kWh) were provided, "−8 to device 308" and "−4 to device 310" may be stored to recognize what amounts were provided to which recipients. Additionally, each flow control device may be configured with one or more wireless (or wired) radios for transmitting information (e.g., instructions to control other devices, requests for power, and/or data about relative flows), directly or through a network, such as the Internet. For example, each flow control device may reconcile its own data records about relative power flows with the other flow control devices with which it is connected.

Figure 4:
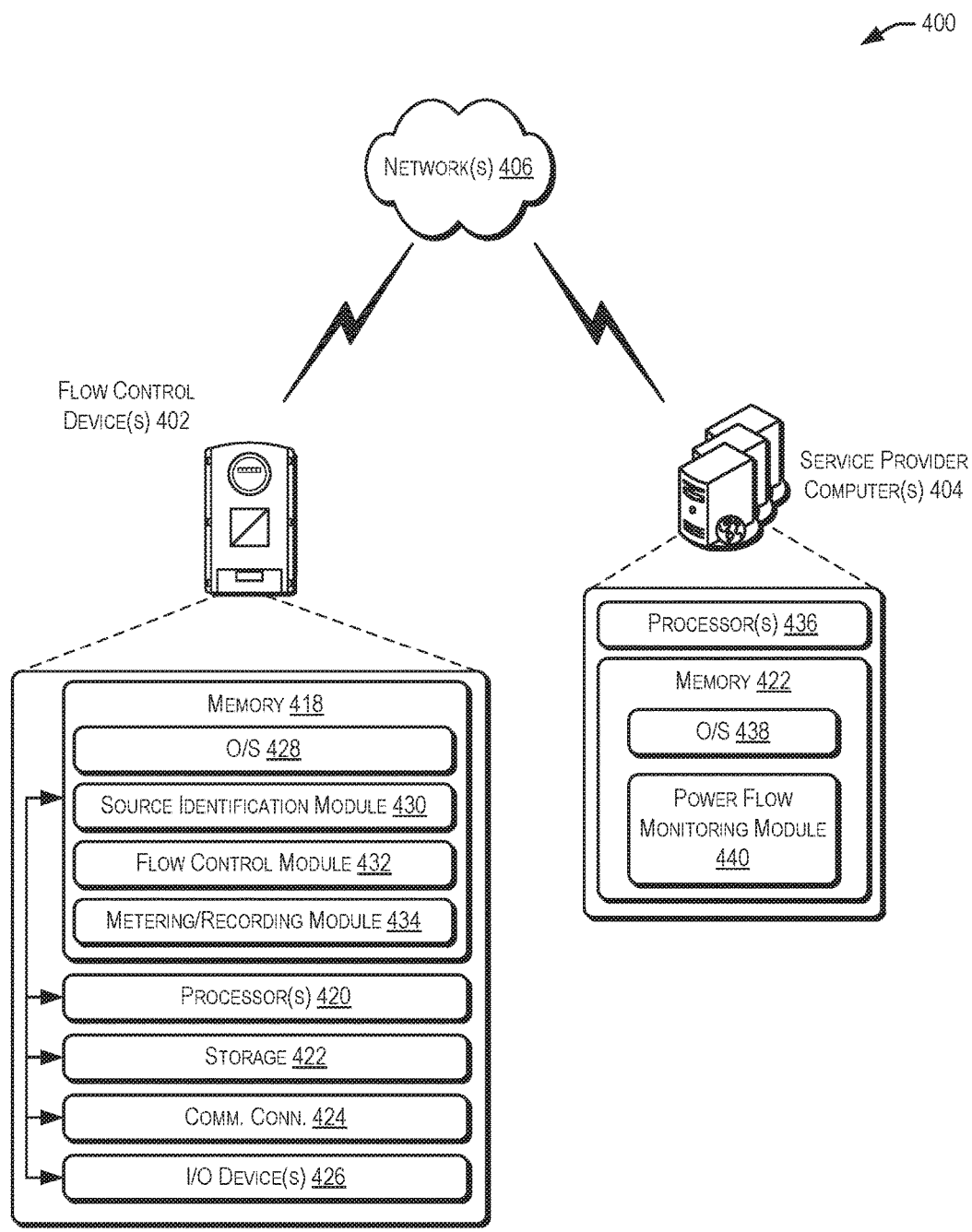
FIG. 4 is another simplified block diagram illustrating an example architecture for implementing flow control devices with a service provider as described herein, according to at least one example.

FIG. 4 shows example architecture 400 for controlling the flow of power between flow control devices that bypass a utility grid. As described herein, example architecture 400 includes one or more flow control devices 402 and/or service provider computers 404 connected via one or more networks 404, according to at least one example. In architecture 400, flow control devices 402 may communicate directly with one another (e.g., utilizing wired connections such as the electrical cables described with reference to at least FIG. 1) or they may utilize networks 406 (or other networks) to communicate and/or interact with one another. In some aspects, the logic for controlling flow control devices 402 may be performed locally at each flow control device 402, or it may be performed by one or more service provider computers 404. In this way, flow control devices 402 may provide information (e.g., amounts of power provided, requested, consumed, etc.) to service provider computers 404 and/or control the flow of power based at least in part on instructions received from service provider computers 404.

Service provider computers 404 may, in some examples, communicate with flow control devices 402 through a gateway device of the end-user energy generation system and/or located at the location of flow control devices 402. As such, service provider computer 404 may provide control signals to the gateway devices for controlling flow control devices 402 or it may provide the control signals directly to flow control devices 402.

In some examples, networks 406 may include any one or a combination of many different types of networks, such as cable networks, the Internet, wireless networks, cellular networks, or other private and/or public networks. In some examples, flow control devices 402 may be configured with a control module. The control module may be responsible for controlling the output of power flow on the electrical cables described herein.

Flow control devices 402 and/or service provider computers 404 may be (or may include) any type of computing devices such as, but not limited to a server computer, a personal computer, a smart phone, a personal digital assistant (PDA), an integrated circuit, a microcontroller, etc. In some examples, service provider computers 404 may be in communication with flow control devices 402 via networks 406 and/or through the gateway devices, or via other network connections. Additionally, flow control devices 402 and/or service provider computers 404 may be part of a distributed system.

In one illustrative configuration, flow control devices 402 may include at least one memory 418 and one or more processing units (or processor(s)) 420. The processor(s) 420 may be implemented as appropriate in hardware, computer-executable instructions, firmware, or combinations thereof. Computer-executable instruction or firmware implementations of processor(s) 420 may include computer-executable or machine-executable instructions written in any suitable programming language to perform the various functions described.

Memory 418 may store program instructions that are loadable and executable on processor(s) 420, as well as data generated during the execution of these programs. Depending on the configuration and type of flow control devices 402 and/or service provider computers 404, memory 418 and/or memory 422 of service provider computers 404 may be volatile (such as random access memory (RAM)) and/or non-volatile (such as read-only memory (ROM), flash memory, etc.). Flow control devices 402 and/or service provider computers 404 may also include additional storage (e.g., storage 422), which may include removable storage and/or non-removable storage. Additional storage 422 may include, but is not limited to, magnetic storage, optical disks, and/or tape storage. Disk drives and their associated computer-readable media may provide non-volatile storage of computer-readable instructions, data structures, program modules, and other data for flow control devices 402 and/or service provider computers 404. In some implementations, the memory of the devices (e.g., memory 418 of flow control devices 402 and/or memory 422 of service provider computers 404) may include multiple different types of memory, such as static random access memory (SRAM), dynamic random access memory (DRAM), or ROM.

The memory and the additional storage, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. The memory and the additional storage are all examples of computer-readable storage media. Alternatively, computer-readable communication media may include computer-readable instructions, program modules, or other data transmitted within a data signal, such as a carrier wave, or other transmission. However, as used herein, computer-readable storage media does not include computer-readable communication media.

Flow control devices 402 and/or service provider computers 404 may also contain communications connection(s) (e.g., communication connections 424) that allow devices 402, 404 to communicate with other devices, a stored database, another computing device or server, user terminals and/or other devices on networks 406. Devices 402, 404 may also include I/O device(s) (e.g., I/O device 426), such as a meter readout device (e.g., display), keyboard, a mouse, a pen, a voice input device, a touch input device, speakers, etc.

Turning to the contents of memory 418 in more detail, memory 418 may include operating system 428 and one or more application programs or services for implementing the features disclosed herein including at least source identification module 430, flow control module 432, and metering/recording module 434. In some cases, source identification module 430 may be configured to identify or otherwise determine a source of power. For example, source identification module 430 may identify whether flow control device 402 is connected to a PV array, a battery backup, and/or a utility grid. Based at least in part on the identification, flow control device 402 can determine an appropriate power type (e.g., AC or DC), whether the power needs to be converted, and/or how to convert it (e.g., using an inverter, a rectifier, or the like). Additionally, in some examples, source identification module 430 may be configured to identify and/or determine the recipient of the power flow, including what type/form of power the recipient will need (e.g., AC or DC). Further, source identification module 430 may also identify a power draw from an expected recipient system. For example, if a connected system is attempting to draw power from the cable, the power draw may be identified.

In some examples, flow control module 432 may be configured to determine an appropriate amount of power to provide over the electrical cables that connect one flow control device to another. For example, flow control module 432 may receive instructions that indicate an amount of power to provide and which other device to send the power flow. Additionally, flow control module 432 may be configured to receive requests (or identification of a power draw) from other flow control devices that identify an amount of power that is being requested (or drawn). Flow control module 432 may also be configured to physically provide the power flow and/or change the impedance of the cable (e.g., when the cable is an AC wire). The amount of power may be provided based at least in part on the power draw that was identified by source identification module 430. Flow control module 432 may also need to be able to control an inverter, which in some cases will control the amount of the power to be provided (e.g., the DC voltage may be controlled by changing an output of the inverter).

Additionally, in some examples, metering/recording module 434 may be configured to measure the amount of power that is provided to other devices and/or received by flow control device 402. Metering/recording module 434 may provide a readout on a display of flow control device 402 that indicates an amount of power it has provided, and to which devices. Metering/recording module 434 may also be configured to record the amounts of power that were measured (e.g., the data may be stored in memory 418 and/or storage 422). In some cases, the relative power flow that is identified, measured, and/or recorded may be monitored based at least in part on a metric of a metering device coupled to flow control device 402.

In one illustrative configuration, service provider computers 404 may also include one or more processing units (or processor(s)) 436. The processor(s) 436 may be implemented as appropriate in hardware, computer-executable instructions, firmware, or combinations thereof. Computer-executable instruction or firmware implementations of processor(s) 436 may include computer-executable or machine-executable instructions written in any suitable programming language to perform the various functions described.

Turning to the contents of memory 422 in more detail, memory 422 may include operating system 438 and one or more application programs or services for implementing the features disclosed herein including at least power flow monitoring module 440. In some cases, power flow monitoring module 440 may be configured to monitor the power flow of one or more flow control devices 402. For example, power flow monitoring module 440 may receive information from flow control devices 402 that include information about how much power has been provided, from which flow control devices 402 to which other flow control devices. Additionally, the information may also indicate credits and/or debits to power usage accounts that indicate relative consumption (e.g., of one devices consumption of power from another device) and/or amounts of power that one device might owe to another device. For example, two devices may share power during a 24-hour period (e.g., as in the example of FIG. 2). However, a first device may consume more power from a second device than the second device consumed from the first during that period (or during any period). In this example, the first device may "owe" the second device some power. As such, the second device may have a credit in a power account that can be redeemed for power from the first device at a different time.

As such, power flow monitoring module 440 may store the information that it receives from flow control devices 402, manage the credits and/or debits, and/or instruct flow control devices 402 regarding how much power to provide to each other and when. In some examples, power flow monitoring module 440 may also be configured to receive power requests from one or more flow control devices 402 and determine which other flow control devices 402 are best situated (e.g., have the most ability to provide power) to act as the source of the power to fulfill the request. Once determined, power flow monitoring module 440 can send instructions to the potential source, and instruct that flow control device 402 to provide the requested amount of power to the requesting flow control device. Further, power flow monitoring module 440 may be configured to identify an electrical connection, independent of connections to a utility grid, between a first end-user electrical system and a second end-user electrical system. Power flow monitoring module 440 may also be configured to receive information that identifies that at least a first device of the first end-user electrical system provided a flow of power over the electrical connection from the first end-user electrical system to the second end-user electrical system. Power flow monitoring module 440 may also be configured to monitor relative power flow between the first end-user electrical system and the second end-user electric system based at least in part on the flow of the power through the electrical connection.

FIGS. 5-9 show example flow diagrams of methods 500, 600, 700, 800, and 900 for controlling flow control devices, as described herein. Methods 500, 600, 700, 800, and 900 are illustrated as a logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

Figure 5:
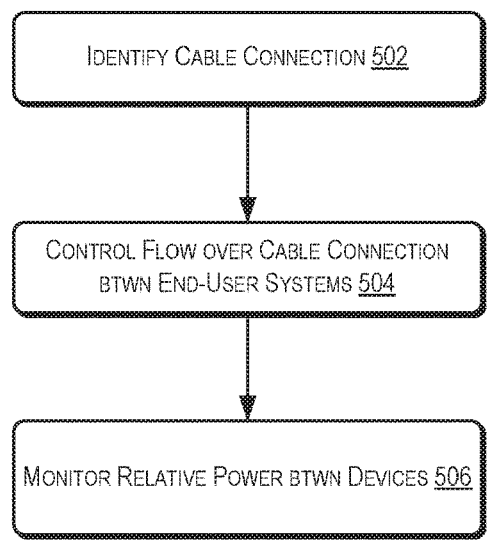
FIG. 5 is a simplified flow diagram illustrating an example process associated with controlling energy generation interactions that bypass the grid described herein, according to at least one example.

In some examples, one or more processors (e.g., processors 420) of flow control device 402 of FIG. 4, may perform method 500 of FIG. 5. Method 500 may begin at 502, where a flow control device (e.g., flow control device 402) or a server computer in communication with flow control device 402 may identify a cable connection (e.g., between two end-user systems). In some examples, the cable connection may already exist between the two devices, yet at 502, flow control device 402 identifies the connection and/or to which other device it is connected. In some cases, identifying the cable connection may include enabling the connection by activating a switch or other actuator that physically connects the two end-user systems, or at least opens the connection at the side of the end-user system controlled by the device performing the identification. Additionally, at 502, flow control device 402 may determine the type of the cable connection (e.g., AC or DC). At 504, method 500 may control power flow over the cable connection between the two end-user systems. As noted, if the cable connection is comprised of a DC line, the flow may be controlled by adjusting the DC voltage drop over the cable. However, if the cable connected is comprised of an AC line, flow control device 402 may instead alter the impedance of the cable. Once the flow of power is provided, the relative power flow between the devices may be monitored at 506. The monitoring may include reading or otherwise identifying a metric of a metering device that is coupled to flow control device 402. Additionally, the relative flow and/or relative power consumption of each device may be recorded.

Figure 6:
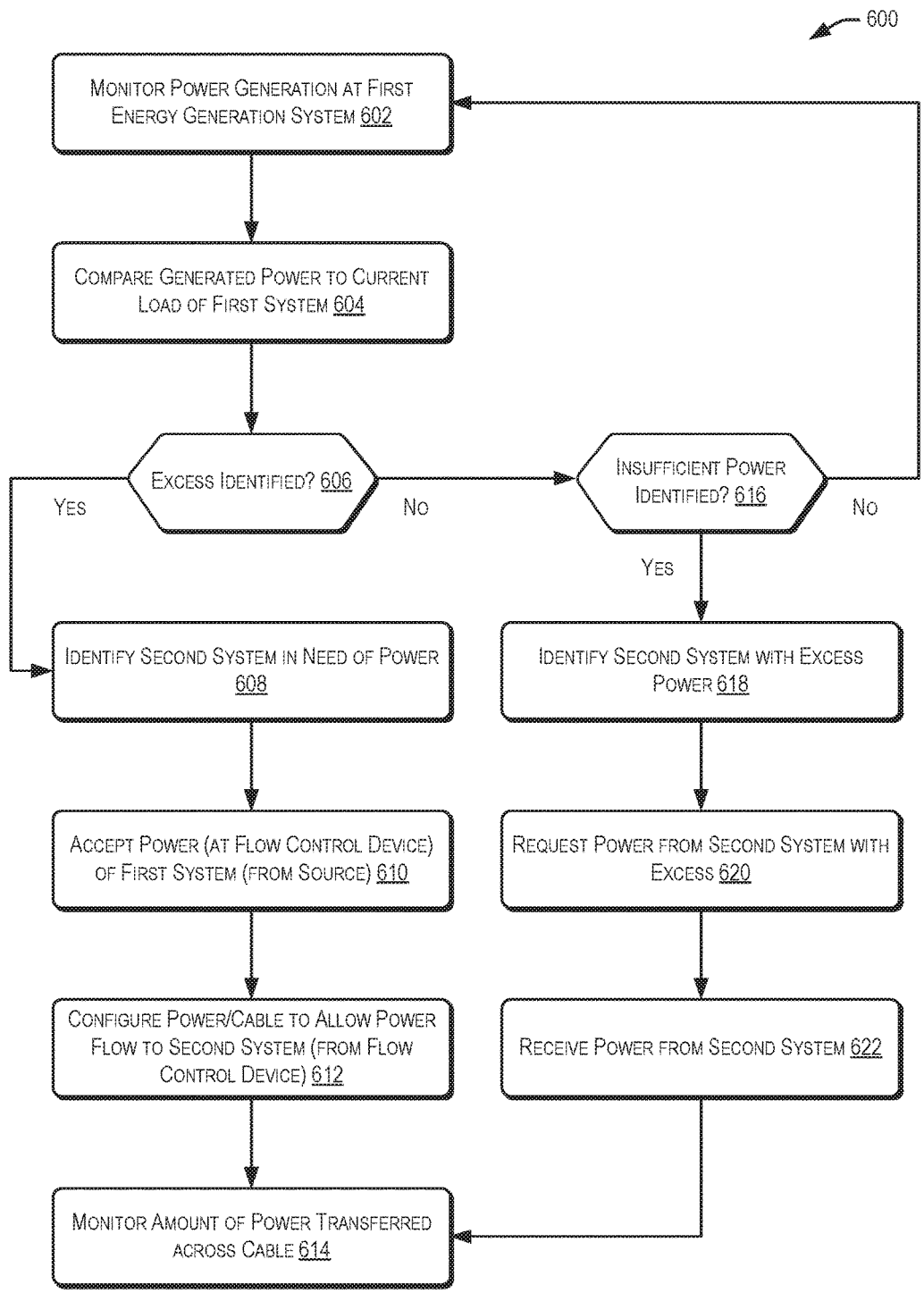
FIG. 6 is a simplified flow diagram illustrating an example process associated with controlling energy generation interactions that bypass the grid described herein, according to at least one example.

In some examples, one or more processors (e.g., processors 420) of flow control device 402 of FIG. 4, may perform method 600 of FIG. 6. Method 600 may begin at 602, where an amount of power generation (e.g., by a PV array or other source) at a first energy generation system may be monitored. In some cases, the amount of power generation may be measured by a metering device. Additionally, the power monitored may include power received from a utility grid or other external source. At 604, the amount of power being generated (or received from an external source) may be compared to a current load on the first energy generation system. The load may be made up of local appliances or other devices being utilized at a location associated with the first energy generation system (e.g., at an end-user's residence or commercial building). In some examples, the first energy generation system may determine whether there is an excess amount of power being generated or received by the first system at 606.

If an excess is identified at 606, method 600 may then identify a second energy generation (or energy storage) system that is in need of power at 608. The second system may be identified based at least in part on a load identified at the second system and/or based at least in part on a request from the second system. In another aspect, an ability to store power in an energy storage system may help identify the second system. In still another aspect, utility pricing data, historical usage patterns, predicted usage patterns, and/or relative power sharing levels may be used to inform a selection of a second energy system. At 610, method 600 may accept power from the first system at a flow control device (e.g., flow control device 402 of FIG. 4). The power may be accepted from a source connected to the first system.

For example, the source may be a PV array or other power generation device and/or the source may be a utility grid. Accepting the power at the flow control device may include providing an instruction to the flow control device to activate a switch that opens flow of power from the source to the flow control device. At 612, method 600 may configure the power and/or a cable to allow power flow to the second system (e.g., from the flow control device). Configuring the power may include converting the power to DC form so that the voltage may be adjusted. In this way, the power flow may be controlled by adjusting the output voltage of the flow control device so that the DC voltage may flow to the second system. Alternatively, configuring the cable may include adjusting an impedance of the electrical cable in order to control the amount of AC power provided to the second system. In some examples, the first system may provide an offer to the second system (and receive an acceptance) prior to providing any power to the second system. At 614, method 600 may monitor the amount of power transferred across the cable (e.g., the amount of power provided to the second system).

Alternatively, if excess power is not identified at 606, method 600 may determine whether the first system has insufficient power, at 616, based at least in part on the comparison of the power generated at the first to the load of the first system. If not, method 600 may continue monitoring the amount of power generated by the first system at 602. However, if insufficient power is identified at 616, method 600 may identify a second system with excess power at 618. The second system may be identified based at least in part on information received from the second system. For example, the second system may provide an offer to the first system. Based at least in part on the identification of the second system, method 600 may request power from the second system at 620. The request may be formatted as computer-readable instructions and/or may be based at least in part on an application programming interface (API) method call that the two systems are configured to process. At 622, power may be received from the second system. The power may be in AC or DC form. Further, method 600 may monitor the amount of power transferred across the cable at 614 (e.g., the amount of power received from the second system).

Figure 7:
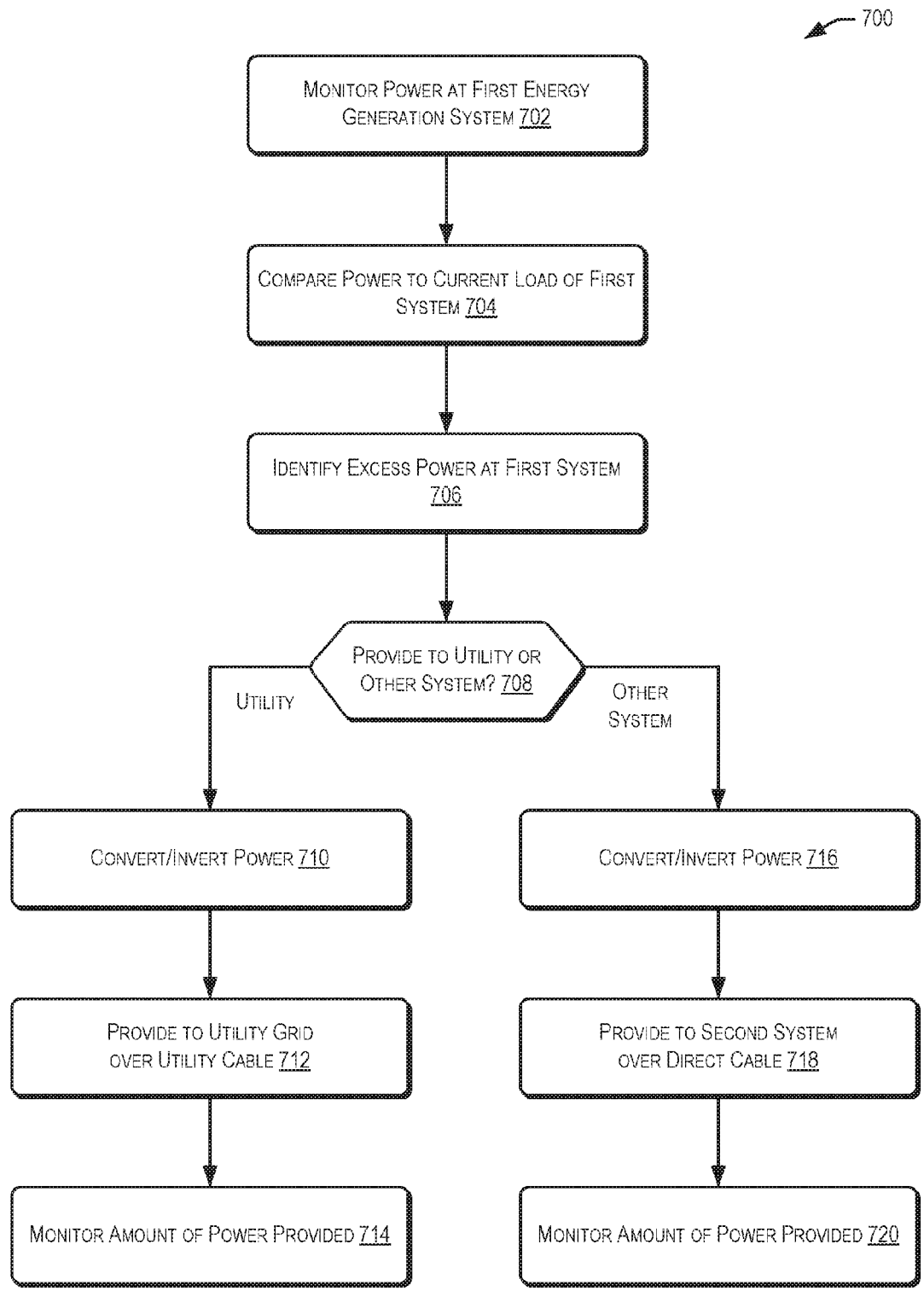
FIG. 7 is a simplified flow diagram illustrating an example process associated with controlling energy generation interactions that bypass the grid described herein, according to at least one example.

In some examples, one or more processors (e.g., processors 420) of flow control device 402 of FIG. 4, may perform method 700 of FIG. 7. Method 700 may begin at 702, where an amount of power at a first system may be monitored. The power at the first system may be power that is generated at the first system (e.g., by a PV array or other source), power that is received from a utility grid or other source, or power that is stored at the first system (e.g., in a battery or other storage device). At 704, the amount of power identified at the first system may be compared to a current load of the first system. In some examples, the first system may determine that there is an excess amount of power at the first system at 706. Based at least in part on this determination, method 700 may determine whether to provide power to a utility grid or to another system (e.g., a neighboring system configured as a power generation system and/or a power storage system) at 708. The determination may be based at least in part on one or more of a few factors including, but not limited to, utility pricing data (e.g., current pricing rates versus historical pricing rates), historical power usage data of either the first system or the other systems, and/or future usage predictions of either the first system or the other systems. The future usage predictions may, in some cases, be based at least in part on the historical usage data. In some examples, it may be determined (at 708) to provide the excess power to the utility grid when the current utility pricing data indicates a peak or is above some threshold value. However, in some examples, it may be determined to provide the excess power to other systems that are directly connected to the first system when the utility pricing is above the threshold value. For example, if the utility pricing is very high, the first system may be able to provide power to their neighbor for a lower price than the utility price, but still at a price above what it cost the first system to acquire (or generate) the power initially. Still, in other examples, the determination may be based at least in part on historical usage data and/or future usage predictions. For example, if the first system is able to predict that a second (or other) system is going to request or need power at some time in the future, they may store some of that power (e.g., in a local battery pack) and provide the power to the second system during that time as opposed to sending back to the utility grid.

If it is determined, at 708, to provide the excess power to the utility grid, method 700 may convert/invert the power as appropriate (e.g., if the power is in DC form, it can be changed to AC form; however, if it is AC form, no change may be needed) at 710. At 712, method 700 may provide the power to the utility grid over a utility cable. Further, method 700 may monitor the amount of power provided over the utility cable to the utility grid at 714. Alternatively, if it is determined, at 708, to provide the excess power to one or more other systems, method 700 may convert/invert the power as appropriate (e.g., the power may be changed to AC or DC form depending on the type of electrical cable being used and/or the type of power expected by the other systems) at 716. At 718, method 700 may provide the power to the other systems over a direct cable (e.g., a cable that bypasses the utility grid connection). Further, method 700 may monitor the amount of power provided over the direct cable connection at 720.

Figure 8:
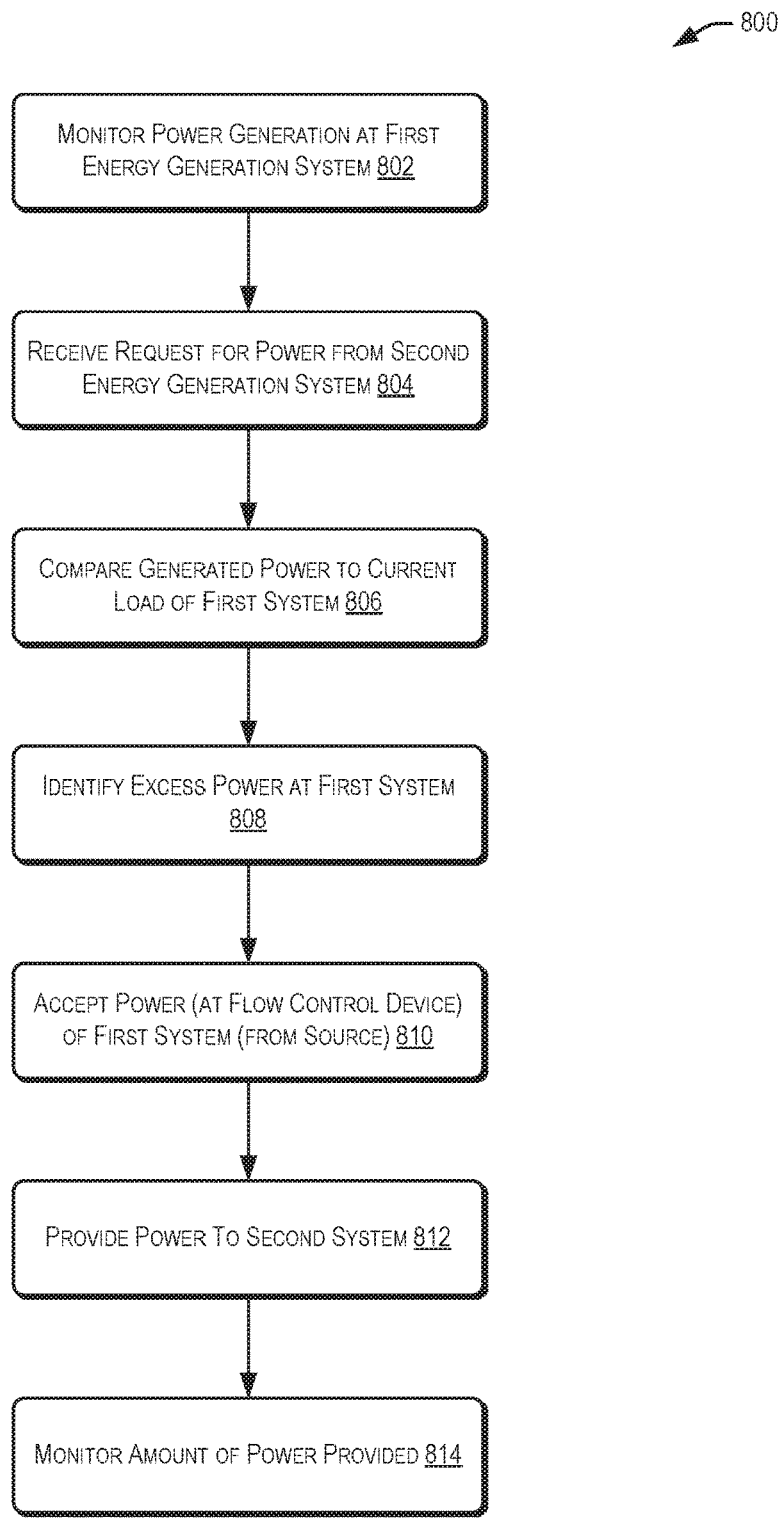
FIG. 8 is a simplified flow diagram illustrating an example process associated with controlling energy generation interactions that bypass the grid described herein, according to at least one example.

In some examples, one or more processors (e.g., processors 420) of flow control device 402 of FIG. 4, may perform method 800 of FIG. 8. Method 800 may begin at 802, where an amount of power generation (e.g., by a PV array or other source) at a first energy generation system may be monitored. At 804, method 800 may receive a request for power from a second system (e.g., an energy generation and/or energy storage system). In some examples, the amount of power being generated (or received from an external source) may be compared to a current load of the first system at 806. At 808, excess power at the first system may be identified based at least in part on the comparison at 806. In some cases, the comparison may be performed based at least in part on the request received from the second system. In other words, the comparison may not be performed until or unless the second system requests power. In this way, the first system may reduce computational overhead by not continuously checking for excess power. However, if another system is requesting power, then method 800 may perform the comparison at 806 and identify the excess at 808. At 810, method 800 may accept power from the first system at a flow control device (e.g., flow control device 402 of FIG. 4). As noted, accepting the power at the flow control device may include providing an instruction to the flow control device to activate a switch that opens flow of power from the source to the flow control device. At 812, method 800 may provide an amount of power to the second system. Further, at 814, method 800 may monitor the amount of power provided to the second system.

Figure 9:
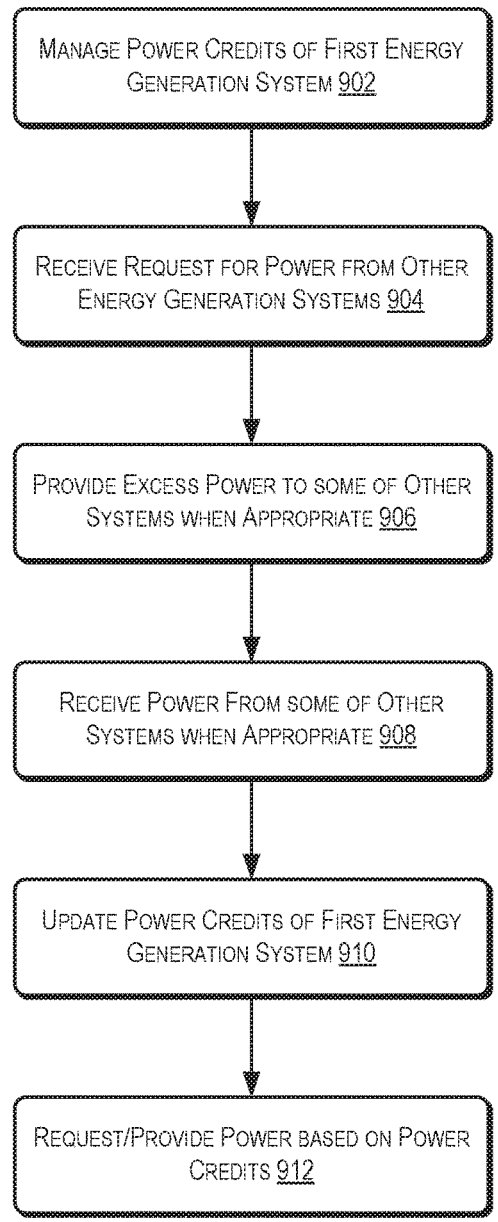
FIG. 9 is a simplified flow diagram illustrating an example process associated with monitoring energy transfers that bypass the grid described herein, according to at least one example.

In some examples, one or more processors (e.g., processors 420) of flow control device 402 of FIG. 4, may perform method 900 of FIG. 9. Method 900 may begin at 902, where an amount of power credits of a first system are managed. Managing the power credits may include storing a table associated with an account of the end-user corresponding to the first system. Power credits may be units of measurement that identify how much power has been provided to which other systems. For example, it may be advantageous to track, using the credits, how much power is provided to each system (for example in kWh), so that a first end-user knows how much power it owes to other end-users and/or how much power is owed back to the first end-user. In other examples, power credits may be monetary units that correspond to a dollar amount that the power provided and/or received is worth. The table may be stored in a database and/or the cloud and may be configured to manage credits owed to each respective other system that is directly connected to the first system. In some cases, end-users must first register and/or join a service (e.g., the service provider 404 of FIG. 4) that is configured to aid in tracking and/or managing the power credits. The service provider 404 may also manage monetary accounts and/or send/receive money between the accounts of the registered end-users.

At 904, method 900 may receive a request for power from one of the other systems that is directly connected to the first system. As noted, the request may be a computer-readable instruction (API method call or the like) and/or may be transmitted over the direct cable connection or via another network connection (e.g., wired or wireless connections). Excess power may then be provided from the first system to one or more of the other systems at 906. Additionally, at other times and/or concurrently (e.g., utilizing multiple different direct connections), excess from some of the other systems may be received over the direct cable connections at 908. In some examples, method 900 may update the power credits of the first system, at 910, based at least in part on the amounts of power that were provided and/or received by the first system. In some examples, the power credits may be updated on regular intervals and/or continuously. Further, in some examples, method 900 may request and/or offer power to other systems based at least in part on the updated power credits at 912.

Figure 10:
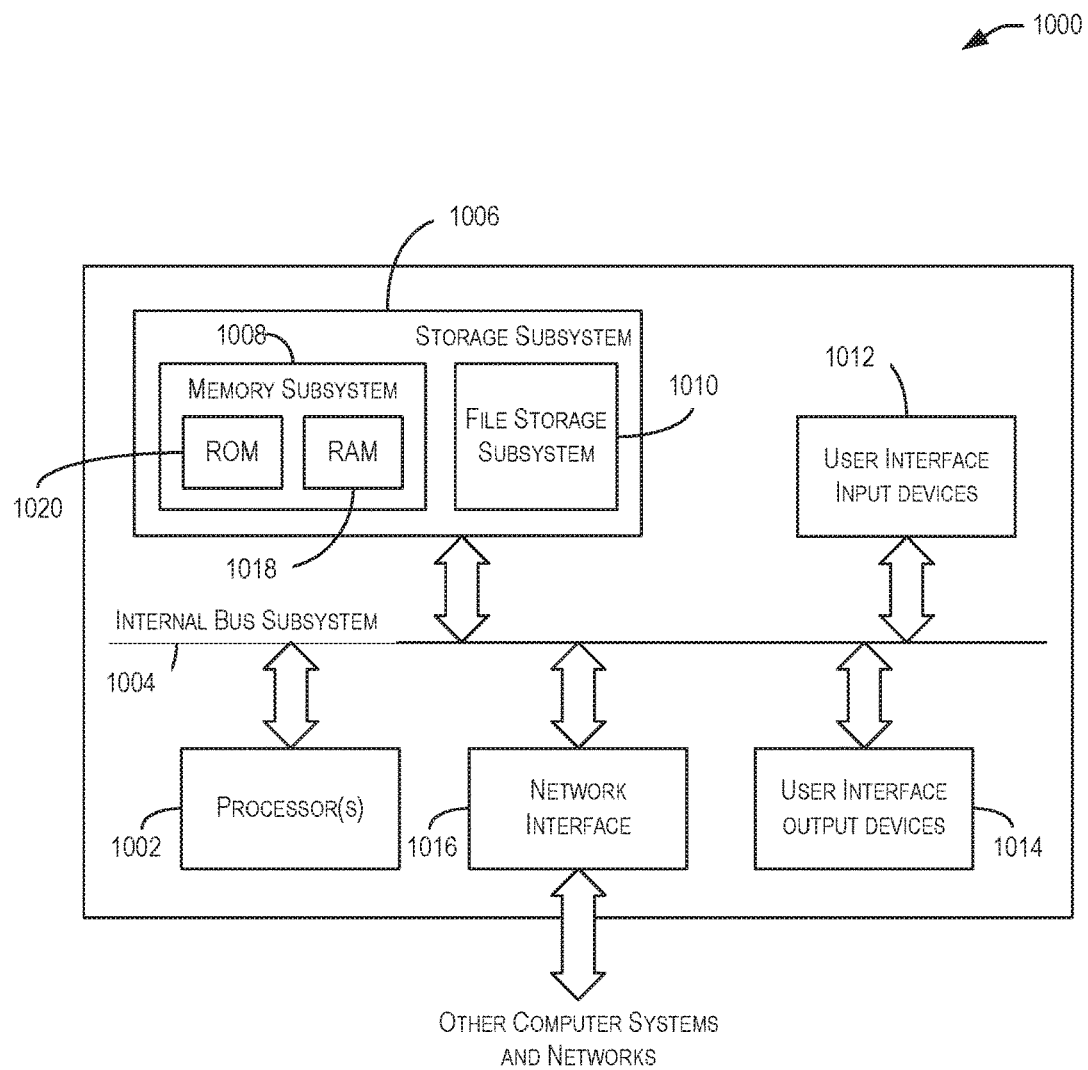
FIG. 10 is a simplified block diagram of a computing system for implementing some of the examples described herein, according to at least one example.

FIG. 10 is a simplified block diagram of computer system 1000 according to an embodiment of the present disclosure. Computer system 1000 can be used to implement any of the computer systems/devices (e.g., flow control devices 402 and/or service provider computers 404) described with respect to FIGS. 1-4. As shown in FIG. 10, computer system 1000 can include one or more processors 1002 that communicate with a number of peripheral devices via bus subsystem 1004. These peripheral devices can include storage subsystem 1006 (comprising memory subsystem 1008 and file storage subsystem 1010), user interface input devices 1012, user interface output devices 1014, and network interface subsystem 1016.

In some examples, internal bus subsystem 1004 can provide a mechanism for letting the various components and subsystems of computer system 1000 communicate with each other as intended. Although internal bus subsystem 1004 is shown schematically as a single bus, alternative embodiments of the bus subsystem can utilize multiple buses. Additionally, network interface subsystem 1016 can serve as an interface for communicating data between computer system 1000 and other computer systems or networks (e.g., networks 406 of FIG. 4). Embodiments of network interface subsystem 1016 can include wired interfaces (e.g., Ethernet, CAN, RS232, RS485, etc.) or wireless interfaces (e.g., ZigBee, Wi-Fi, cellular, etc.).

In some cases, user interface input devices 1012 can include a keyboard, pointing devices (e.g., mouse, trackball, touchpad, etc.), a barcode scanner, a touch-screen incorporated into a display, audio input devices (e.g., voice recognition systems, microphones, etc.), and other types of input devices. In general, use of the term "input device" is intended to include all possible types of devices and mechanisms for inputting information into computer system 1000. Additionally, user interface output devices 1014 can include a display subsystem, a printer, or non-visual displays such as audio output devices, etc. The display subsystem can be any known type of display device. In general, use of the term "output device" is intended to include all possible types of devices and mechanisms for outputting information from computer system 1000.

Storage subsystem 1006 can include memory subsystem 1008 and file/disk storage subsystem 1010. Subsystems 1008 and 1010 represent non-transitory computer-readable storage media that can store program code and/or data that provide the functionality of embodiments of the present disclosure. In some embodiments, memory subsystem 1008 can include a number of memories including a main RAM 1018 for storage of instructions and data during program execution and a ROM 1020 in which fixed instructions may be stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and not intended to limit embodiments of the present disclosure. Many other configurations having more or fewer components than system 1000 are possible.

Illustrative methods and systems for controlling flow control devices are described above. Some or all of these systems and methods may, but need not, be implemented at least partially by architectures such as those shown at least in FIGS. 1-10 above. While many of the embodiments are described above with reference to information and/or control signals, it should be understood that any type of electronic content may be managed using these techniques. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

The various embodiments further can be implemented in a wide variety of operating environments, which in some cases can include one or more user computers, computing devices or processing devices which can be used to operate any of a number of applications. User or client devices can include any of a number of personal computers, such as desktop or laptop computers running a standard operating system, as well as cellular, wireless and handheld devices running mobile software and capable of supporting a number of networking and messaging protocols.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A device for managing power flow between a plurality of electrical systems, comprising:
    an electrical cable configured to connect, independent of connections to a power grid, a first end-user electrical system of the plurality of electrical systems to a second end-user electrical system of the plurality of electrical systems;
    an inverter, coupled with the electrical cable, configured to change a type of power from a direct current form to an alternating current form;
    a memory configured to store computer-executable instructions; and
    a processor configured to access the memory and execute the computer-executable instructions to at least:
        identify power generated by a power generation device of the first end-user electrical system of the plurality of electrical systems;
        change the type of the power, utilizing the inverter, from the direct current form to the alternating current form;
        identify a power draw of a first amount of the power from the first end-user electrical system of the plurality of electrical systems;
        compare the power generated by the power generation device of the first end-user electrical system to the first amount of the power drawn from the first end-user electrical system;
        in accordance with a determination that a first excess amount of power is identified via the comparison between the power generated by the power generation device of the first end-user electrical system to the first amount of the power drawn by the first end-user electrical system:
            identify that the second end-user electrical system of the plurality of electrical systems has a deficit amount of the power;
            configure the electrical cable to allow power flow to the second end-user electrical system of the plurality of electrical systems; and
            control a first flow of the first excess amount of the power over the electrical cable from the first end-user electrical system of the plurality of electrical systems to the second end-user electrical system of the plurality of electrical systems based at least in part on the deficit amount of the power;
        in accordance with a determination that the excess amount of power is not identified via the comparison between the power generated by the power generation device of the first end-user electrical system to the first amount of the power drawn by the first end-user electrical system and that an insufficient amount of the power is identified via the comparison between the power generated by the power generation device of the first end-user electrical system to the first amount of the power drawn by the first end-user electrical system:
            identify that the second end-user electrical system of the plurality of electrical systems has a second excess amount of power;
            request a second flow of the second excess amount of the power over the electrical cable from the second end-user electrical system of the plurality of electrical systems to the first end-user electrical system of the plurality of electrical systems; and
            receive the second flow of the power over the electrical cable from the second end-user electrical system of the plurality of electrical systems based at least in part on the insufficient amount of the power; and
        monitor relative power flow between the plurality of electrical systems based at least in part on the first flow of the power and the second flow of the power over the electrical cable.

2. The device of claim 1, wherein the second flow of the power from the second end-user electrical system is received based at least in part on a request sent from the first end-user electrical system to the second end-user electrical system.

3. The device of claim 1, further comprising a rectifier, coupled with the electrical cable, configured to change the type of power from the alternating current form to the direct current form.

4. The device of claim 3, wherein the second flow of the power is received from the second end-user electrical system in the alternating current form.

5. The device of claim 1, further comprising a metering device coupled with at least one of the electrical cable, the memory, or the processor.

6. The device of claim 5, wherein the relative power flow between the plurality of electrical systems is further monitored based at least in part on a metric of the metering device.

7. A computer-implemented method for managing power flow between a plurality of electrical systems, comprising:
    identifying power generated by a power generation device of a first end-user electrical system of a plurality of electrical systems;
    changing a type of the power, utilizing an inverter, from a direct current form to an alternating current form;
    identifying a power draw of a first amount of the power from the first end-user electrical system of the plurality of electrical systems;
    comparing the power generated by the power generation device of the first end-user electrical system to the first amount of the power drawn from the first end-user electrical system;
    in accordance with a determination that a first excess amount of power is identified via the comparison between the power generated by the power generation device of the first end-user electrical system to the first amount of the power drawn by the first end-user electrical system:
identifying that a second end-user electrical system of the plurality of electrical systems has a deficit amount of the power;
configuring an electrical cable to allow power flow to the second end-user electrical system of the plurality of electrical systems; and
controlling a first flow of the first excess amount of the power over the electrical cable from the first end-user electrical system of the plurality of electrical systems to the second end-user electrical system of the plurality of electrical systems based at least in part on the deficit amount of the power;
in accordance with a determination that the excess amount of power is not identified via the comparison between the power generated by the power generation device of the first end-user electrical system to the first amount of the power drawn by the first end-user electrical system and that an insufficient amount of the power is identified via the comparison between the power generated by the power generation device of the first end-user electrical system to the first amount of the power drawn by the first end-user electrical system:
identifying that the second end-user electrical system of the plurality of electrical systems has a second excess amount of power;
requesting a second flow of the second excess amount of the power over the electrical cable from the second end-user electrical system of the plurality of electrical systems to the first end-user electrical system of the plurality of electrical systems; and
receiving the second flow of the power over the electrical cable from the second end-user electrical system of the plurality of electrical systems based at least in part on the insufficient amount of the power; and
monitoring relative power flow between the plurality of electrical systems based at least in part on the first flow of the power and the second flow of the power over the electrical cable.

8. The computer-implemented method of claim 7, wherein the power generation device comprises a photovoltaic cell of the first end-user electrical system of the plurality of electrical systems, and wherein controlling the first flow of the power comprises providing the power over the electrical cable.

9. The computer-implemented method of claim 7, further comprising identifying a power draw from the second end-user electrical system of the plurality of electrical systems, wherein the power draw is identified based at least in part on a request received from the second end-user electrical system of the plurality of electrical systems.

10. The computer-implemented method of claim 7, wherein the first flow or the second flow of the power over the electrical cable is controlled by changing an impedance of the electrical cable.

11. The computer-implemented method of claim 7, further comprising calculating a relative power metric for the plurality of electrical systems based at least in part on the relative power flow.

12. The computer-implemented method of claim 7, wherein the power comprises electricity in a direct current form, and wherein the flow of the power over the electrical cable is controlled by changing a direct current voltage of the electricity.

13. The computer-implemented method of claim 7, further comprising storing a metric associated with the relative power flow based at least in part on an amount of the power provided over the electrical cable from the first end-user electrical system to the second end-user electrical system.

14. The computer-implemented method of claim 13, further comprising determining an amount to charge an entity associated with the second end-user electrical system based at least in part on the metric associated with the relative power flow.

15. A system for managing power flow between a plurality of electrical systems, comprising:
a memory configured to store computer-executable instructions; and
a processor configured to access the memory and execute the computer-executable instructions to at least:
identify power generated by a power generation device of a first end-user electrical system of a plurality of electrical systems;
change a type of the power, utilizing an inverter, from a direct current form to an alternating current form;
identify a power draw of a first amount of the power from the first end-user electrical system of the plurality of electrical systems;
compare the power generated by the power generation device of the first end-user electrical system to the first amount of the power drawn from the first end-user electrical system;
in accordance with a determination that a first excess amount of power is identified via the comparison between the power generated by the power generation device of the first end-user electrical system to the first amount of the power drawn by the first end-user electrical system:
identify that a second end-user electrical system of the plurality of electrical systems has a deficit amount of the power;
configure an electrical cable to allow power flow to the second end-user electrical system of the plurality of electrical systems; and
control a first flow of the first excess amount of the power over the electrical cable from the first end-user electrical system of the plurality of electrical systems to the second end-user electrical system of the plurality of electrical systems based at least in part on the deficit amount of the power;
in accordance with a determination that the excess amount of power is not identified via the comparison between the power generated by the power generation device of the first end-user electrical system to the first amount of the power drawn by the first end-user electrical system and that an insufficient amount of the power is identified via the comparison between the power generated by the power generation device of the first end-user electrical system to the first amount of the power drawn by the first end-user electrical system:
identify that the second end-user electrical system of the plurality of electrical systems has a second excess amount of power;
request a second flow of the second excess amount of the power over the electrical cable from the second end-user electrical system of the plurality of electrical systems to the first end-user electrical system of the plurality of electrical systems; and
receive the second flow of the power over the electrical cable from the second end-user electrical system of the plurality of electrical systems based at least in part on the insufficient amount of the power; and monitor relative power flow between the plurality of electrical systems based at least in part on the first flow of the power and the second flow of the power over the electrical cable.

16. The system of claim 15, wherein the plurality of electrical systems are external to a utility grid.

17. The system of claim 15, wherein the processor is further configured to execute the computer-executable instructions to at least receive flow data from the power generation device that identifies the relative power flow between the first end-user electrical system and the second end-user electric system.

18. The system of claim 17, wherein the processor is further configured to execute the computer-executable instructions to at least determine an amount to credit an entity associated with the first end-user electrical system based at least in part on the flow data.

* * * * *